(12) United States Patent
Schuetz

(10) Patent No.: US 8,243,137 B2
(45) Date of Patent: Aug. 14, 2012

(54) DEVICE FOR OPENING A VEHICLE LOCK AND FOR CAPTURING AN IMAGE ON THE EXTERIOR OF THE VEHICLE

(75) Inventor: Heiko Schuetz, Velbert (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 847 days.

(21) Appl. No.: 12/310,298

(22) PCT Filed: Aug. 10, 2007

(86) PCT No.: PCT/EP2007/007077
§ 371 (c)(1),
(2), (4) Date: Feb. 20, 2009

(87) PCT Pub. No.: WO2008/022717
PCT Pub. Date: Feb. 28, 2008

(65) Prior Publication Data
US 2009/0309971 A1    Dec. 17, 2009

(30) Foreign Application Priority Data
Aug. 22, 2006   (DE) .................. 10 2006 039 192

(51) Int. Cl.
*B60R 25/00* (2006.01)
*H04N 7/18* (2006.01)

(52) U.S. Cl. .................................... 348/148; 70/237
(58) Field of Classification Search .................. 348/148; 359/872; 396/427
See application file for complete search history.

(56) References Cited

U.S. PATENT DOCUMENTS

| | | | | |
|---|---|---|---|---|
| 5,852,943 A | * | 12/1998 | Dutka et al. | 70/237 |
| 7,500,794 B1 | * | 3/2009 | Clark | 396/427 |
| 2006/0171704 A1 | * | 8/2006 | Bingle et al. | 396/419 |
| 2008/0165251 A1 | * | 7/2008 | O'Kere | 348/148 |

FOREIGN PATENT DOCUMENTS

| | | |
|---|---|---|
| DE | 102 04 764 | 8/2003 |
| DE | 102004050297 | 4/2006 |
| EP | 1 529 688 | 5/2005 |
| FR | 2 858 280 | 2/2005 |

* cited by examiner

*Primary Examiner* — Yasin Barqadle
*Assistant Examiner* — Joe Chacko
(74) *Attorney, Agent, or Firm* — Lucas & Mercanti, LLP; Klaus P. Stoffel

(57) ABSTRACT

A device that has the double function of opening a lock upon actuation of a handle, and as the need may arise, of capturing the exterior of the vehicle in an image via a camera. A hole is provided in the back wall of a support shell receiving the handle, and the housing of a module is mounted on the hole. The camera is supported in a pivoting and translatory manner in the module housing via a camera mount between a retracting position and an extending position. Furthermore, a drive and a gear are mounted on the module housing for a rotational-translatory displacement of the camera.

29 Claims, 13 Drawing Sheets

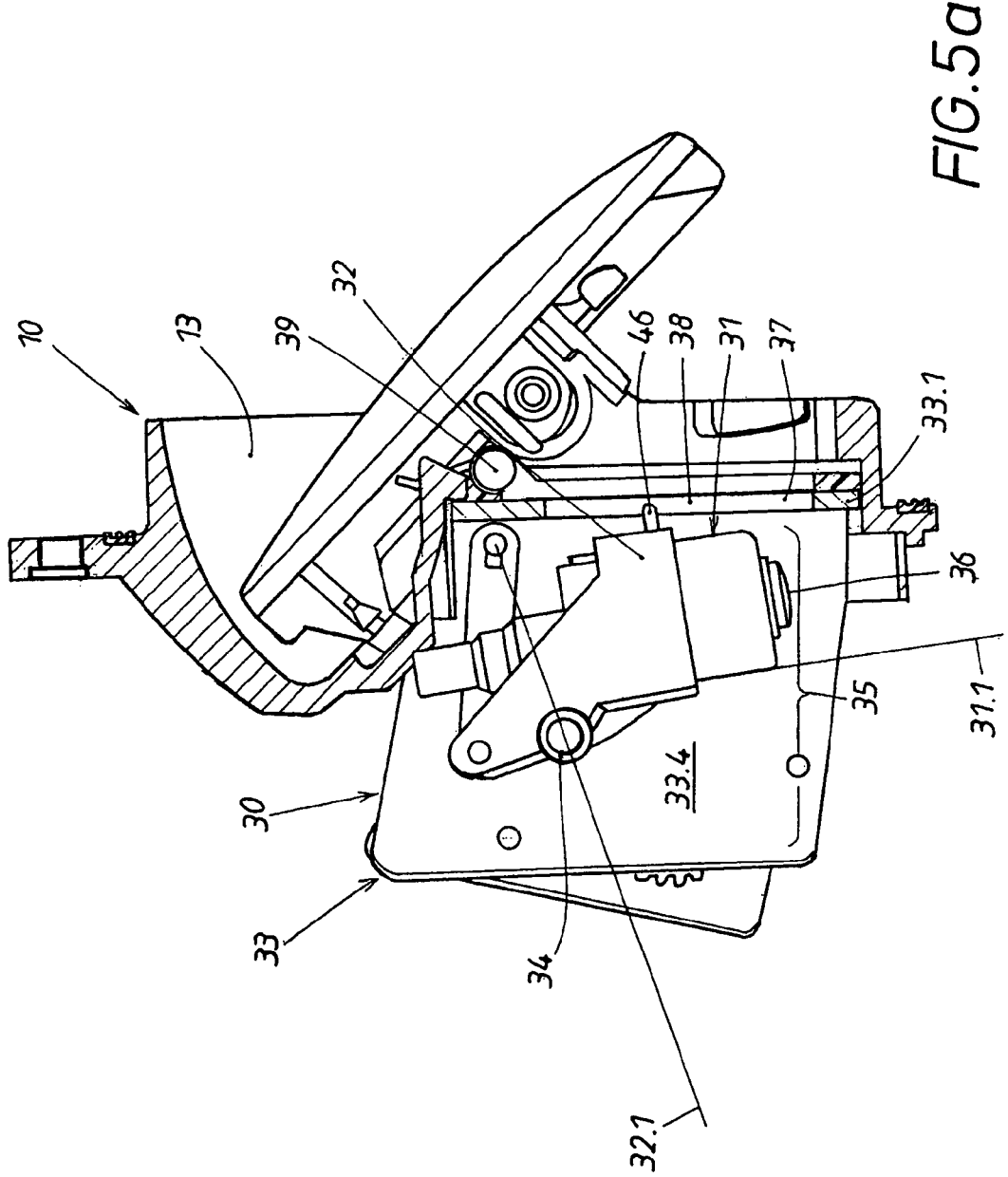

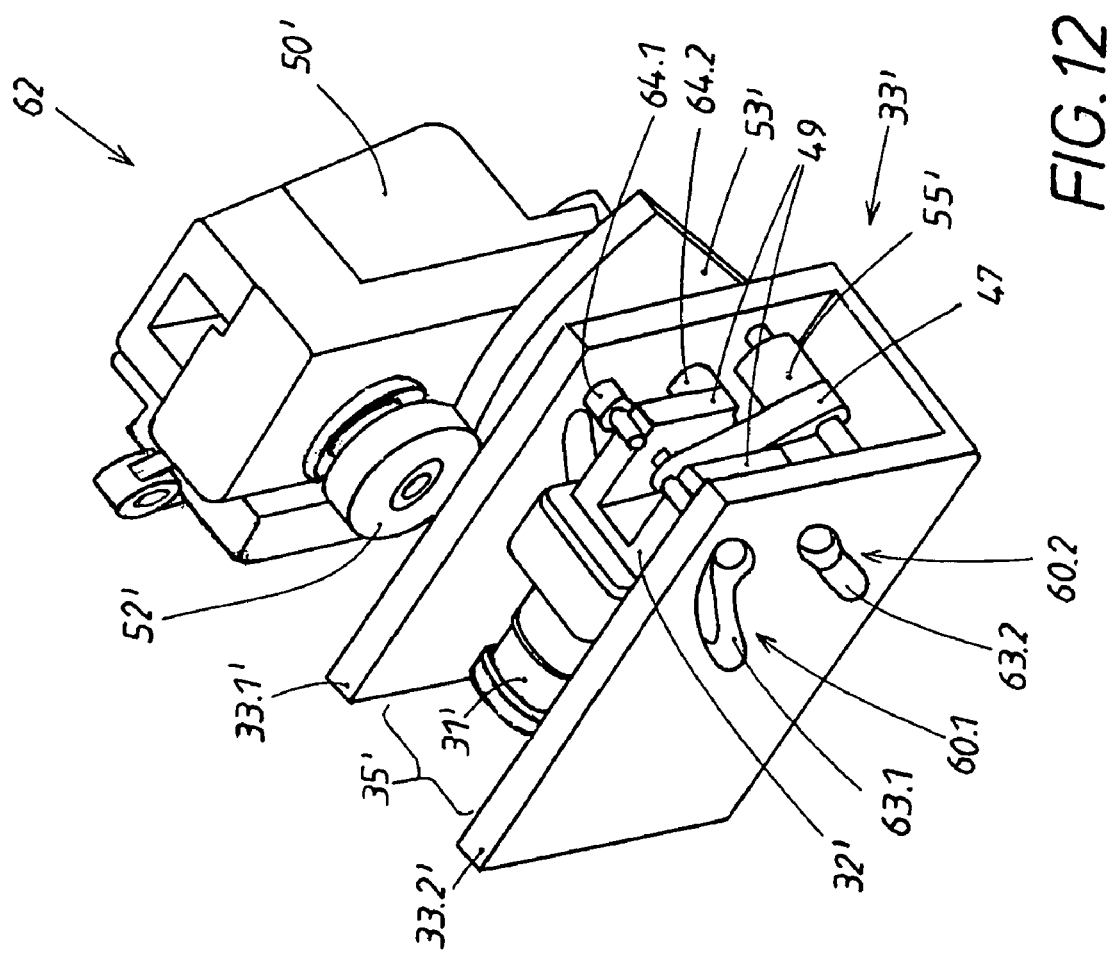

DEVICE FOR OPENING A VEHICLE LOCK AND FOR CAPTURING AN IMAGE ON THE EXTERIOR OF THE VEHICLE

BACKGROUND OF THE INVENTION

The invention concerns a device for opening a lock. This device has a dual function. First, it serves for opening the lock, for which purpose a handle is hinged in a shell-like support, which is located in an opening of the exterior cladding of the body of the vehicle. This shell-like support will be referred to here simply as the "support shell". The handle acts on the lock.

The additional function of the device is to acquire images of the area outside the vehicle. The camera used for this purpose is mounted on the rear wall of the support shell. When the camera is deactivated, the handle is in its closed position, in which it closes the shell opening of the support shell. When the camera is to be activated, the handle is moved into an open position.

DE 10 2004 050 297 A1 discloses a device of this type. In this case, the camera is mounted in a stationary way in the rear wall of the support shell. When the camera is active, the shell opening and the handle, which is in the open position, obstruct the field of view, so that the external area of the vehicle is not adequately acquired.

EP 1 529 688 A1 discloses a device of a different type, in which the camera is nonrotatably mounted on the rear side of a hinged protective element. When the protective element moves on its hinge, the camera swivels along with it. The use of a camera that swivels together with a protective element in this way in a device for opening a lock by means of a handle is difficult and has the disadvantage that during opening movements of the lock, the camera also runs out and can become soiled or damaged. In addition, the simultaneously moving camera increases the weight of the protective element, which means that greater torques are required to swing it out on its hinge.

SUMMARY OF THE INVENTION

The objective of the invention is to develop a reliable device for opening a lock, which has a compact design and carries out the two functions of lock opening and image acquisition in an optimal way.

The invention makes it possible to provide the device with the option of mounting a camera, which is why it can also be used in vehicles where it is only a matter of opening the lock, and image acquisition of the area outside the vehicle is not desired. This is possible, because, on the one hand, the handle can be moved on a hinge in the support shell in the usual way, and the hole in the rear wall of the support shell can also remain unused. Since the handle is mounted independently of the camera, it can be smoothly operated. However, if image acquisition is desired, then, in accordance with the invention, it is sufficient to mount the housing of the module in the hole of the rear wall of the shell. The camera is supported by a mount in the module housing in such a way that it can make both swiveling and translational movements. This mount will be referred to simply as the "camera mount". The module also includes a drive unit, e.g., in the form of an electric motor or a gear unit. The module is completely preassembled and contains all of the elements required for the mechanical support and movement of the camera or its camera mount, together with the necessary electrical connections for signal transmission and power supply.

Because the invention provides rotational-translational means for the movement of the camera, a compact design of the camera in its retracted position is obtained. Specifically, in the retracted position, the camera can be turned away from a window in the module housing. This allows it to assume a space-saving longitudinal position inside the module housing. At the same time, however, the rotational-translational control mechanisms allow the camera, when it is in its extended position, to assume an inclined position inside the housing. The image-recording end of the camera then extends from the module housing and then can also extend from the shell opening of the support shell.

Normally, devices of this type are individually adapted to a vehicle type and have shapes and/or sizes that differ from one another. The invention makes it possible to assign a single modular unit to a large number of different types of the device, in which it is merely necessary to provide the rear wall of the associated support shell with a suitable hole for mounting the housing of the module of the invention. Because only a single model of a module can be used for many different devices, it can be produced in large numbers and thus very inexpensively. The module can be mounted in and dismounted from the hole of the rear wall of the shell quickly and easily.

Additional measures and advantages of the invention are specified in the dependent claims and the following description with reference to the drawings, which illustrate several specific embodiments of the invention.

BRIEF DESCRIPTION OF THE DRAWINGS

FIG. 5a shows a view analogous to FIG. 4 but in a different sectional plane, which also reveals the components located inside the module housing.

FIG. 6b is a graphic representation of the conditions illustrated in FIG. 6a.

FIG. 12 shows a perspective top view of a second alternative for the design of a module of the device of the invention.

DETAILED DESCRIPTION OF THE INVENTION

Figure 1:
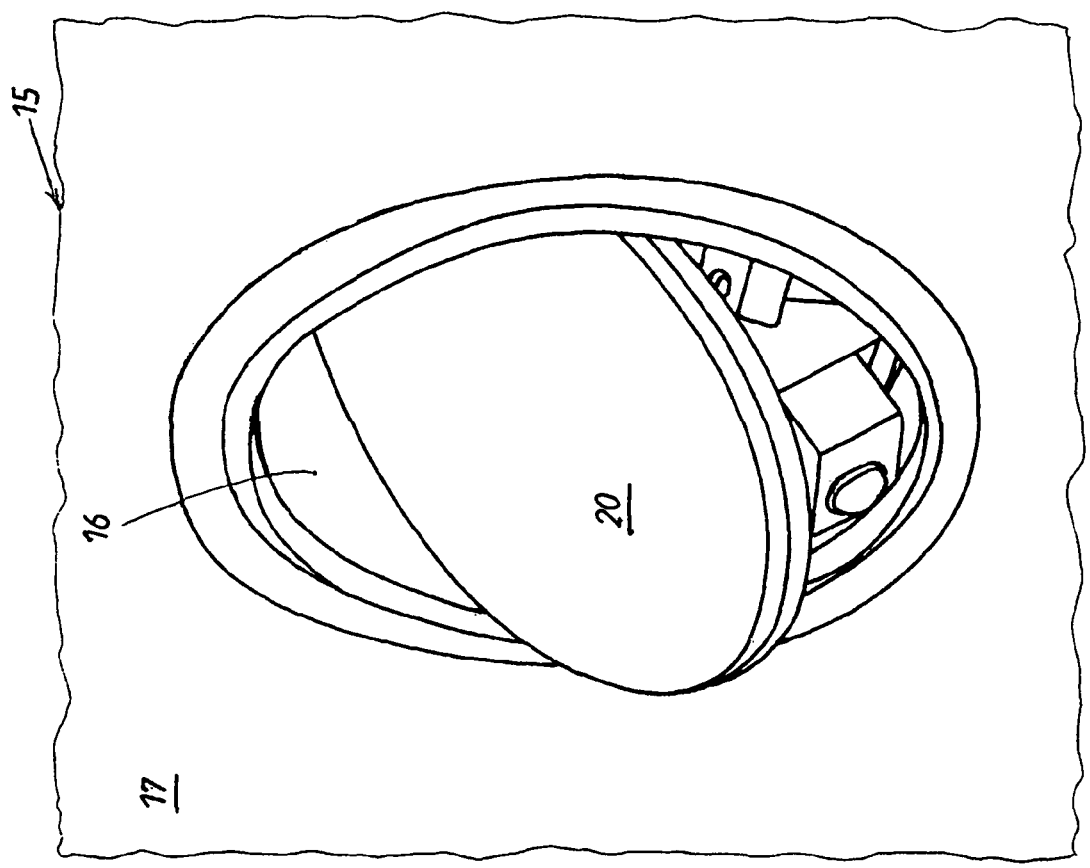
FIG. 1 shows a perspective front view of the device of the invention, when it is mounted in the exterior cladding of a trunk lid of a vehicle, with its handle in the open position and a camera in its extended position.
Figure 2:
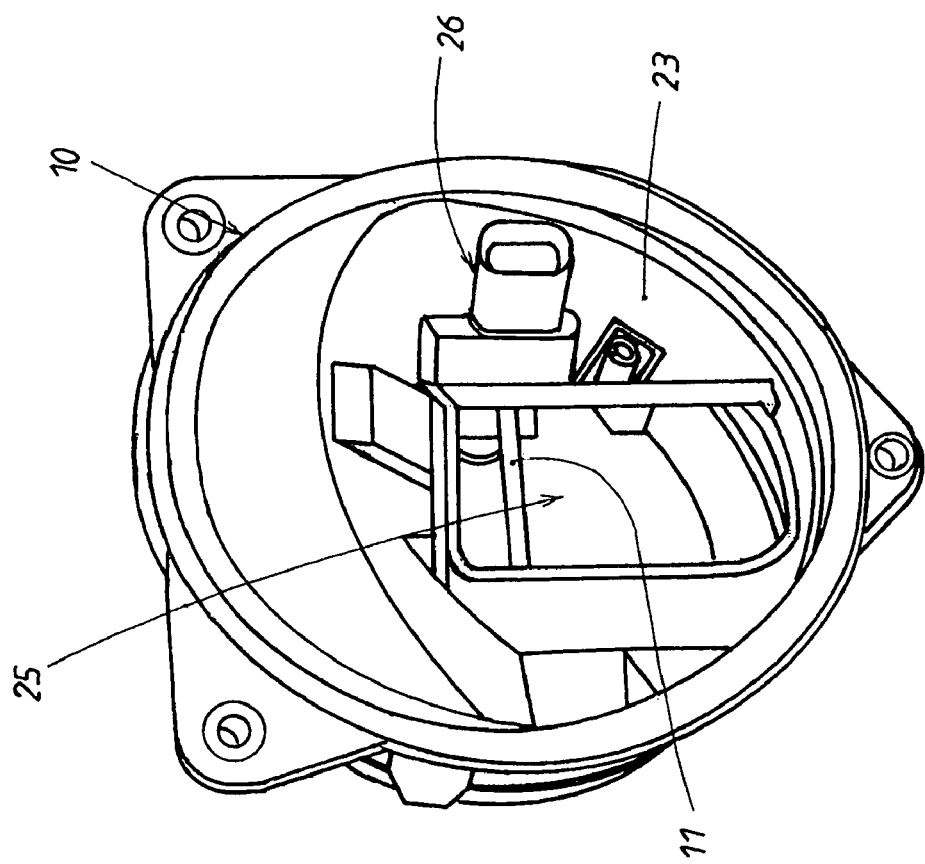
FIG. 2 shows a section of the device of the invention, namely, a rear view of a support shell, on which the other part of the device of the invention, namely, a module, has not yet been mounted.
Figure 4:
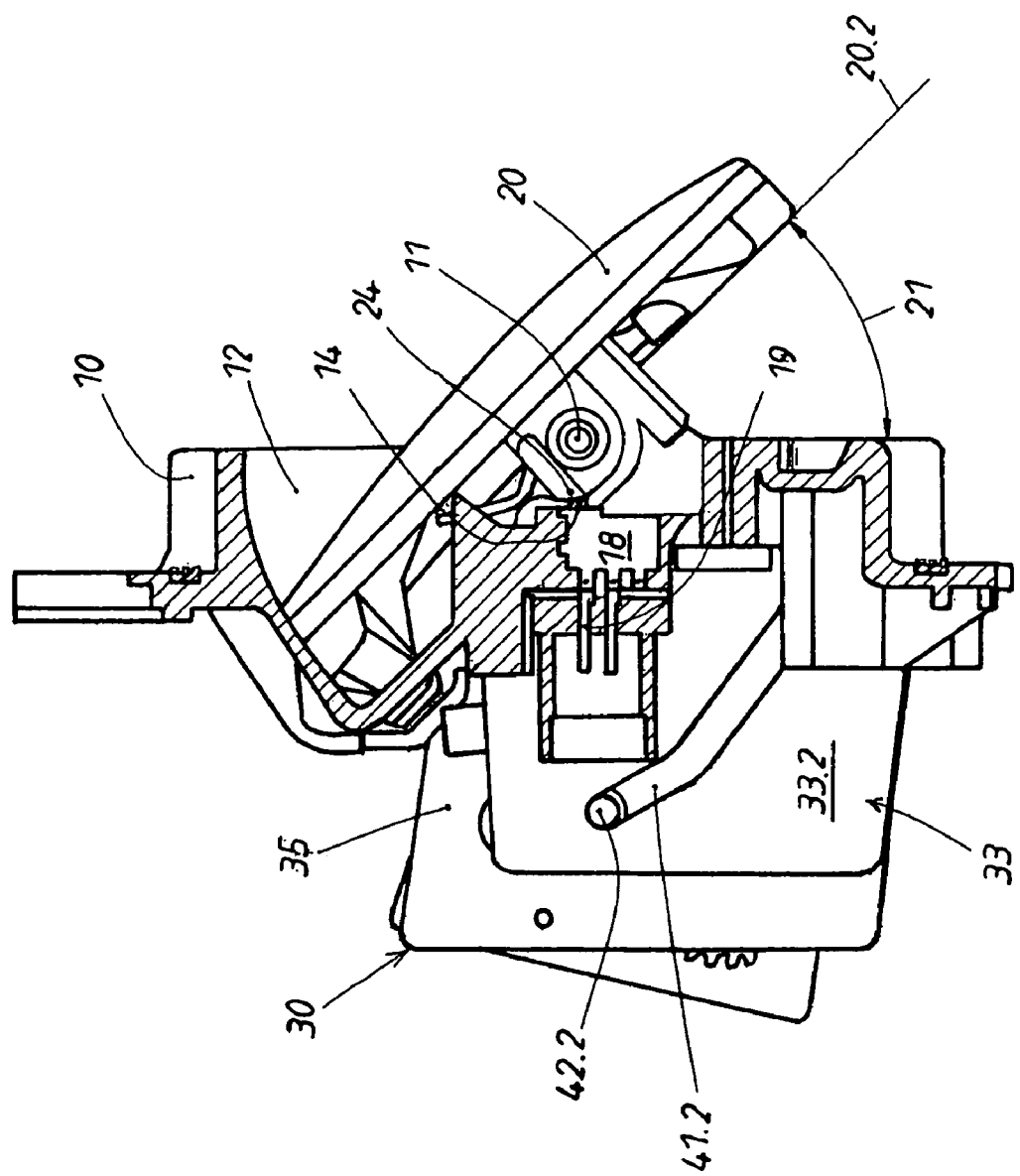
FIG. 4 shows a partially cutaway side view through the device of FIG. 1 or FIG. 3, when the handle is in its open position, but a camera mount is not yet in its retracted position in a housing of the module.

As FIGS. 1, 2, and 4 show, the device of the invention includes a shell-like support 10, which, as was noted earlier, will be referred to as a "support shell". As FIG. 1 shows, this support shell is mounted in an opening 16 of the exterior cladding 17 of a moving part of the automobile body of a vehicle, which in the present case is a trunk lid 15.

Figure 5B:
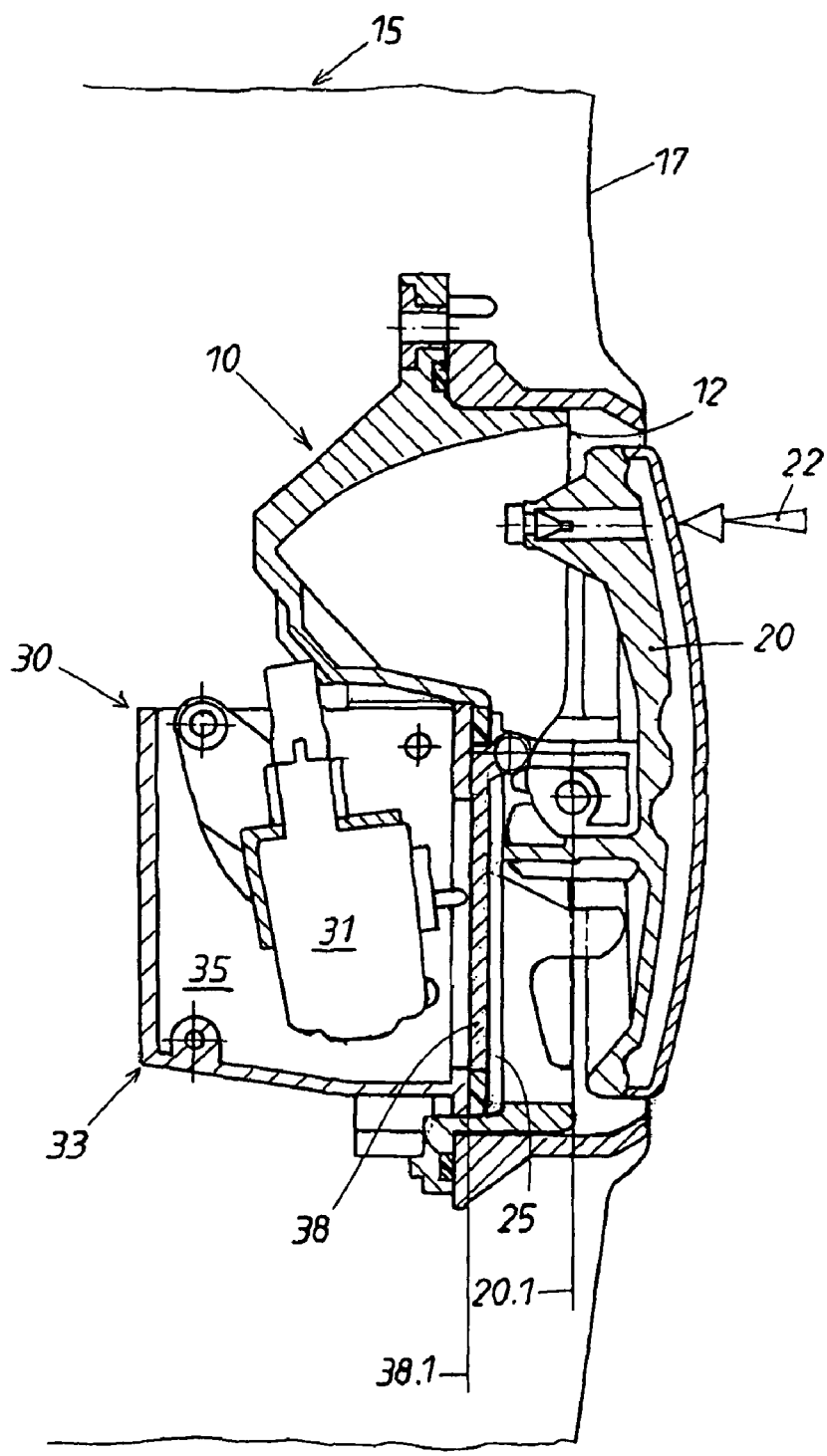
FIG. 5b is a graphic representation of the conditions illustrated in FIG. 5b.
Figure 6A:
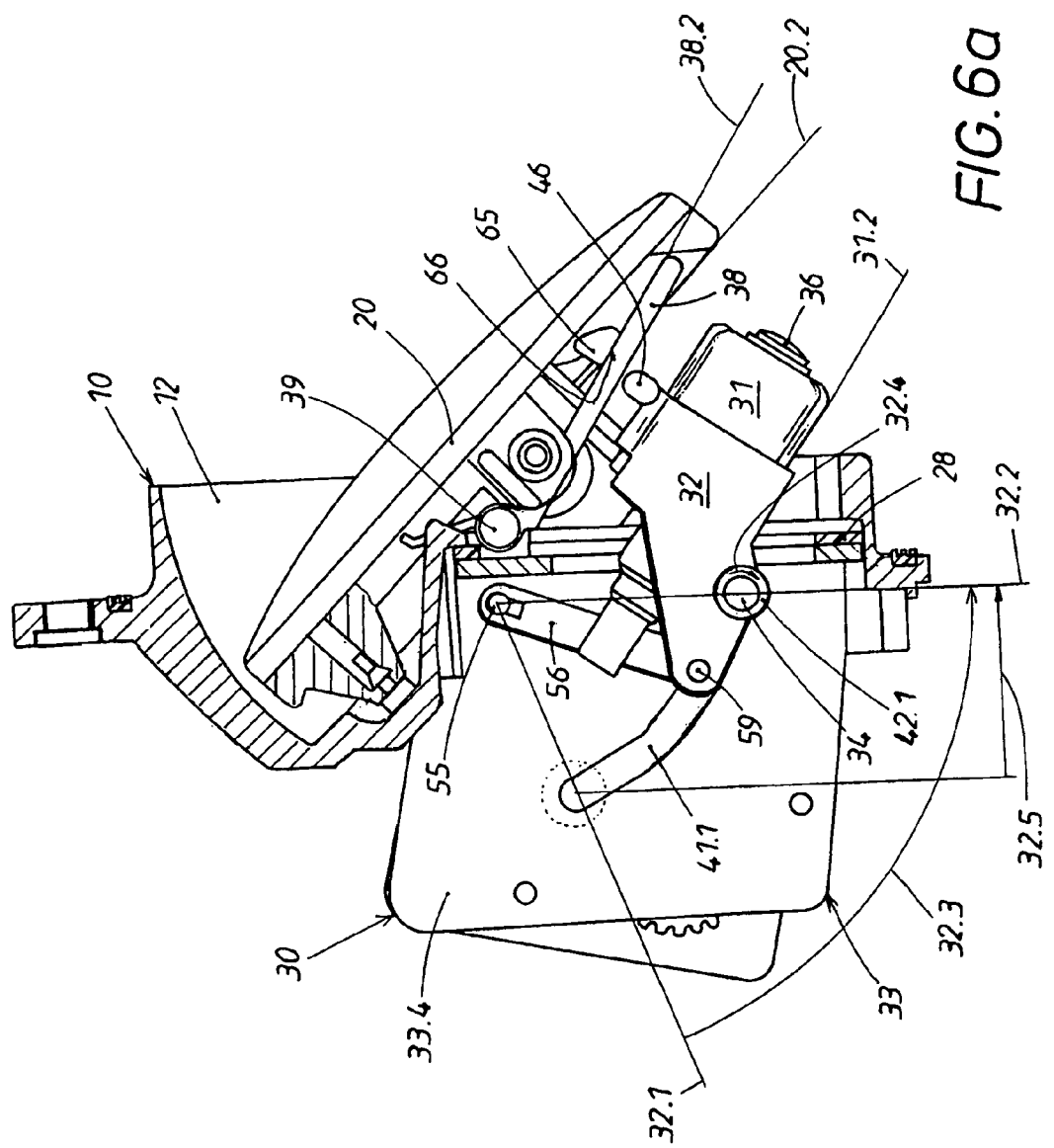
FIG. 6a shows a sectional view that corresponds to FIG. 5a with the handle still in its open position but with the camera now in its extended position in the module housing and with its image-recording end also extending from the shell opening of the support shell.
Figure 6B:
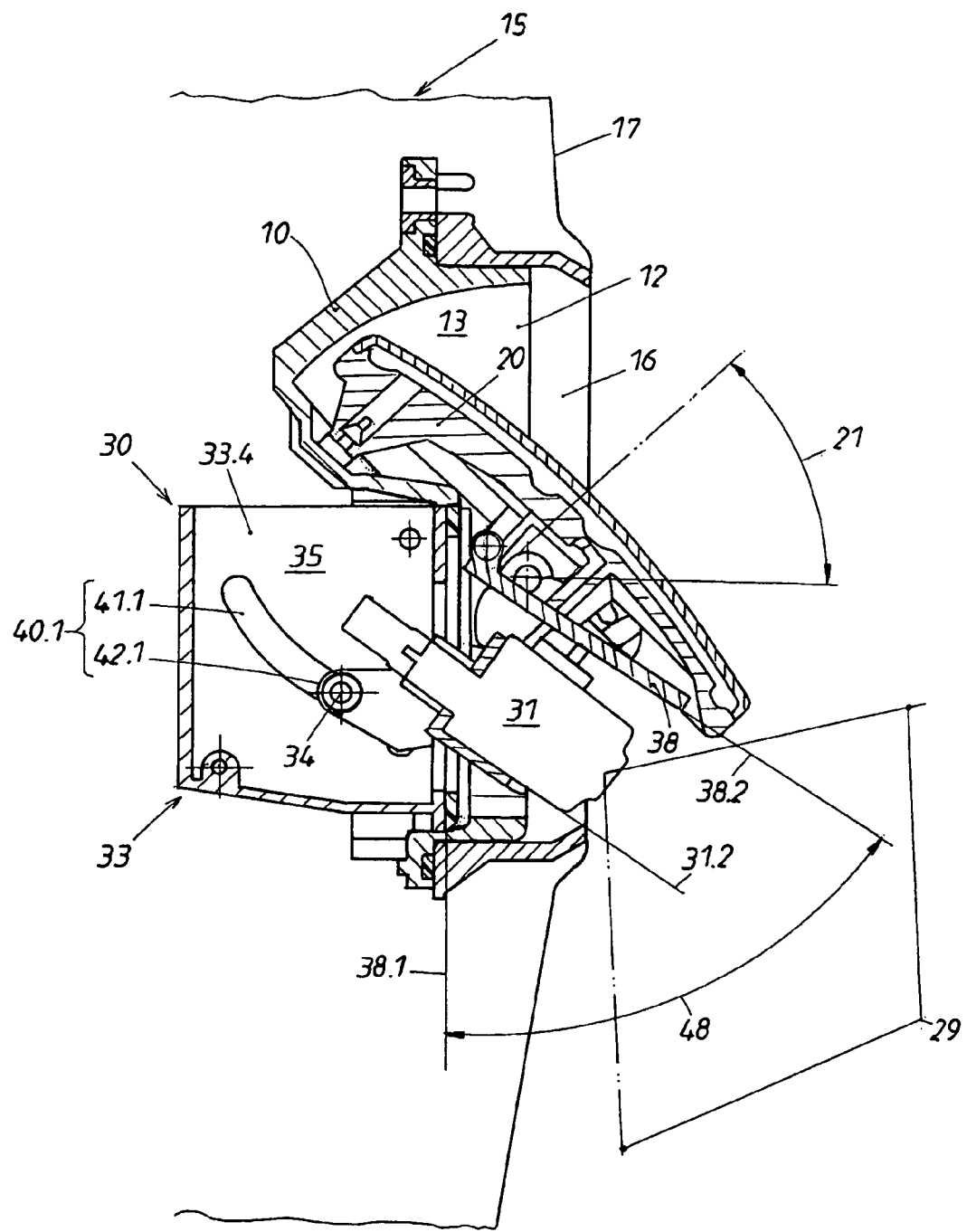

A handle 20 is hinged on an axis 11 in the support shell in such a way that it can move in the direction of the hinge rotation arrow 21 of FIGS. 4 and 6b. In the unactuated closed position 20.1, which is shown in FIG. 5b and illustrated by an auxiliary line, the handle 20 closes a shell opening 12, which faces the opening 16 of the exterior cladding 17. When the handle 20 is operated, it moves into the open position seen in FIG. 4, which is designated in FIG. 6a by the auxiliary line 20.2. The handle 20 is acted upon by a spring force (not shown), which strives to move the handle 20 into the closed position 20.1 shown in FIG. 5b.

The handle 20 is operated by pushing it in the direction of arrow 22, which produces the aforementioned hinge rotational movement 21. During this movement, the upper region of the handle 20 moves into the interior 13 of the support shell 10, while the lower region of the handle swings out of the support shell 10. In the open position 20.2 of FIG. 4, a shoulder 24 pushes against an actuator 14 of an electric switch 18. FIG. 4 also shows the contact pins 19 of this switch 18, which are cast after the switch is mounted in the support shell 10. As FIG. 2 shows, a plug connector 26 for the switch 18 is injected on the rear wall 23 of the support shell 10. The contact pins 19 are electrically connected with the drive unit of a lock (not shown), which opens in the open position 20.2 of the handle 20. The trunk lid 15 can then be swung upward with respect to the stationary part of the automobile body.

Figure 7:
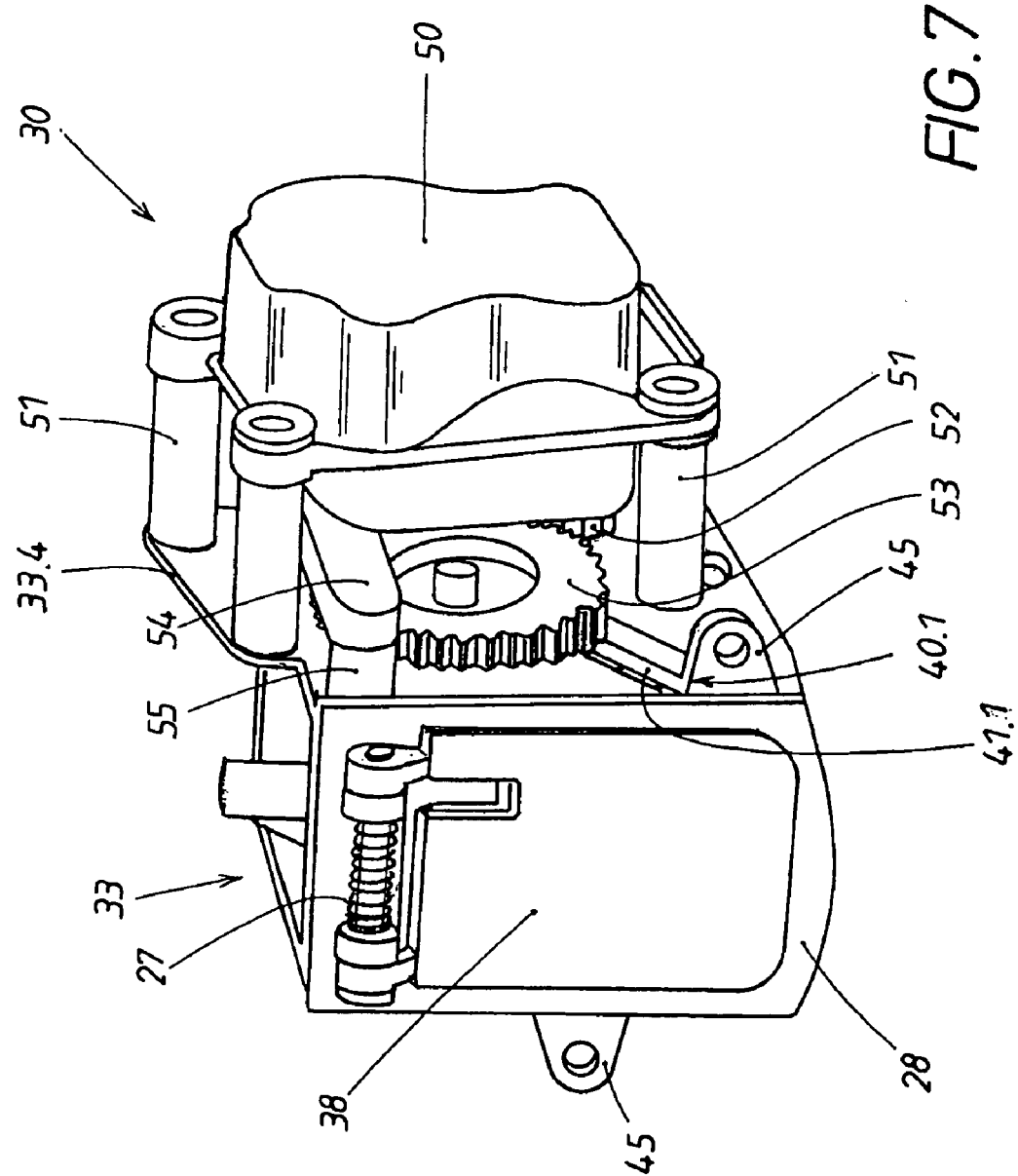
FIG. 7 shows a perspective view of one side of the module before the module has been mounted on the support shell of the device and with the camera in its retracted position.
Figure 8:
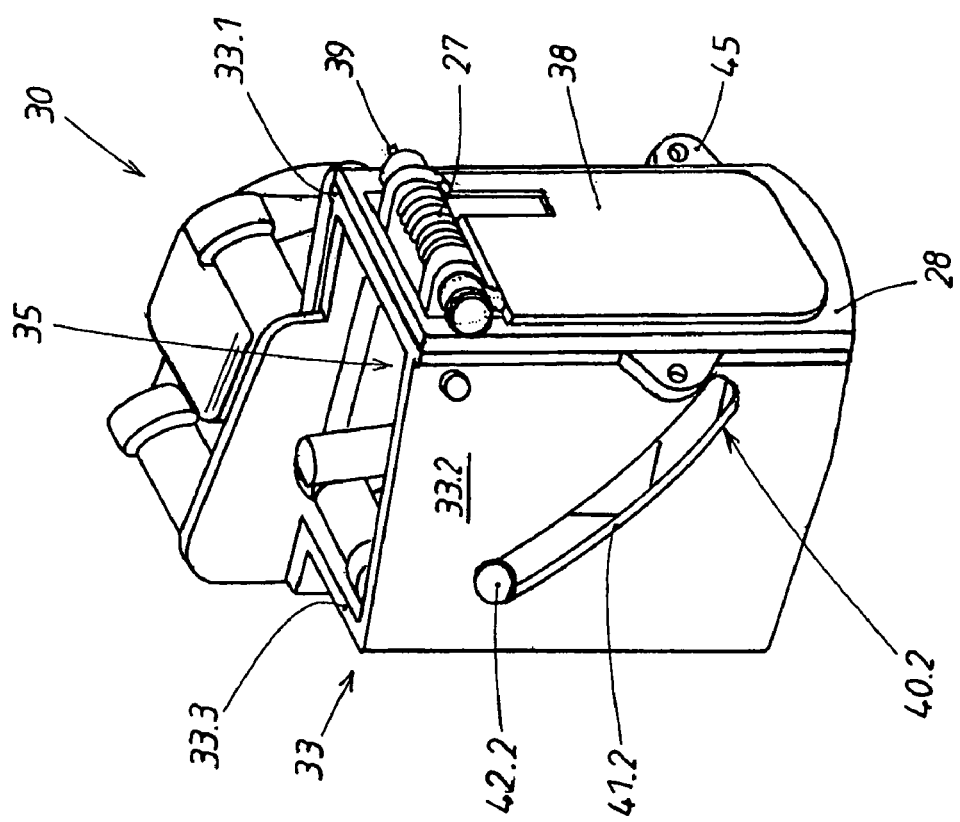
FIG. 8 shows a view analogous to FIG. 7, a perspective view of the module from the opposite side shown in FIG. 7.

As FIG. 2 shows, the rear wall 23 of the support shell 10 has a hole 25, in which a module 30, which is shown in detail in FIGS. 7 to 10, can be optionally mounted. For this purpose, the housing 33 of the module 30 is provided with mounting brackets 45, which are best seen in FIGS. 7 and 8. The module 30 is bolted to the rear wall 23 of the support shell 10 by means of these mounting brackets 45. An important component of the module 30 is an electronic camera 31, which, as shown in FIG. 5a, is held by a mount 32. As has already been mentioned, the holder 32 will be referred to here as the "camera mount".

The module 30 comprises, first of all, a housing 33, which shall be referred to here simply as the "module housing". The module housing 33 has the form of a sleeve with a rectangular profile, which consists of a front sleeve wall 33.1 and, as is shown best in the exploded view of FIG. 9, a first sidewall 33.2 and rear wall 33.3, which are formed as a single piece with the front wall 33.1. The end of the rear wall 33.3 has a flanged strip for connecting the rear wall 33.3 to the second sidewall 33.4. As FIG. 5a shows, the housing interior 35 contains the camera 31, which is held in the camera mount 32. The camera 31 can be rotated together with the camera mount 32 on an axis of rotation 35, but at the same time it can also be moved translationally with its axis of rotation, as is illustrated in detail in FIGS. 5a and 6a.

In FIG. 5a, the camera mount 32 with its axis of rotation 34 is in an inactive position, as indicated by the auxiliary line 32.1. In this position, the camera 31 is in a space-saving longitudinal position in the interior 35 of the housing, in which its image-recording end, indicated by the objective 36, is turned away from a window 37 in the front wall 33.1 of the sleeve. The camera 31 is then located in a retracted position in the housing interior 35, as illustrated by the auxiliary line 31.1. In this position, the window 37 is covered by a cover 38.

Figure 9:
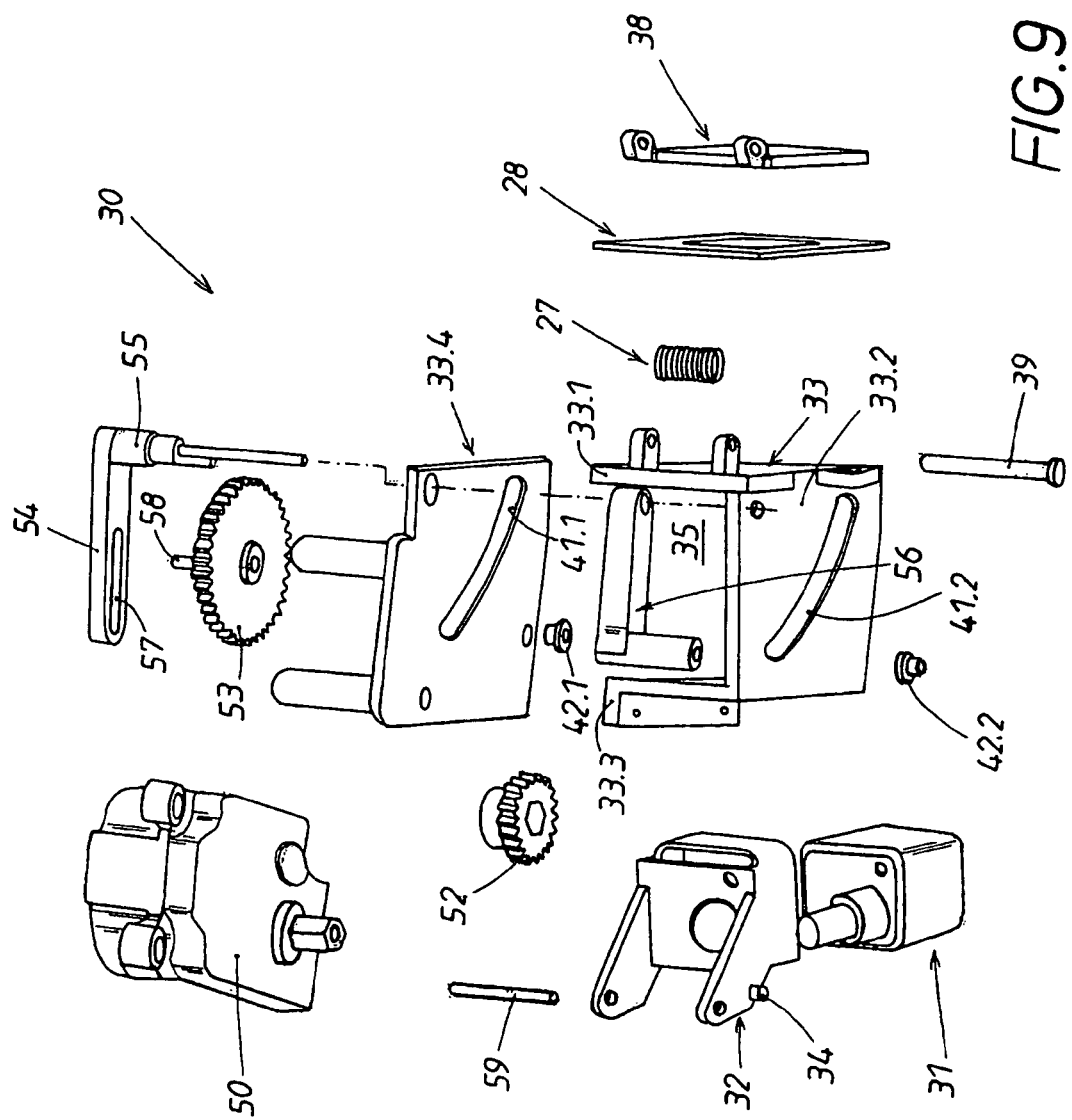
FIG. 9 shows an exploded perspective top view of the parts necessary for the construction of the module.

In this embodiment, the cover 38 is rotatably supported at 39 and is acted upon by a spring 27. The spring 27 acts to keep the cover 38 pressed against the window 37 of the modular housing 33. A gasket 28, which can be seen in FIGS. 7 to 9, is arranged between the face of the window 37 and the cover 38. It tightly seals the interior 35 of the housing 33 from the interior 13 of the support shell 10 when the cover 38 is in its closed position, which is shown in FIG. 5a.

Starting from the inoperative position 32.1 of the camera mount 32 with the camera 31 in its retracted position 31.1, as shown in FIG. 5a, the conditions illustrated in FIG. 6a are obtained after the combined rotational-translational movement. The camera mount 32 then arrives in the operative position indicated by the auxiliary line 32.2. This would be a rotational movement of the camera mount 32 in the direction of the path 32.3 drawn in FIG. 6a. During this movement, the camera mount 32 also carries out a back rotation 32.4 about its axis of rotation 34, which results in the extended position of the camera 31 indicated in FIG. 6a by the auxiliary line 31.2.

Since the inoperative position 32.1 shown in FIG. 5a is also shown in FIG. 6a, one sees not only the rotation 32.4 and the swiveling movement 32.3 but also a translational component 32.5 of the overall movement of the camera mount 32. The image-recording end 36 of the camera 31 extends not only from the module housing 33 but also from the shell opening 12 of the support shell 10. In the extended position 21.2, a large field of view 29 of the camera is obtained, as shown in FIG. 6b. In the extended position 31.2, the camera is approximately parallel to the open position 20.2 of the handle 20.

During the rotational movement 32.3 of the camera mount 32, the cover 38 is also moved out of its closed position indicated in FIG. 5b by the auxiliary line 38.1 into its open position indicated by auxiliary line 38.2 in FIG. 6b. This could be immediately accomplished by supplementing the gear unit that is used to move the camera mount and that will be described in greater detail below. In the present case, this is carried out directly by the camera mount 32, namely, by an actuator 46 provided there, which is designed, for example, as a projection 46 on the camera mount 32, as shown in FIG. 6a. When the camera mount 32 is swiveled, the projection 46 pushes against the inner surface of the cover 38 and lifts it against the aforementioned spring tension of the cover spring 27 of FIG. 7 until it reaches the open position 38.2 shown in FIG. 6b. As long as the camera 31 is in its extended position 31.2 of FIG. 6a, the cover 38 is maintained in its open position 38.2.

The drive for the rotational-translational movement of the camera 31 is provided by an electric or hydraulic drive unit. In the present case, an electric motor 50 is used for this purpose. It is part of the module 30 according to FIGS. 7 to 9. The motor 50 is bolted to the outside of the second sidewall 33.4 of the module housing 33 by means of bolts and spacers 51. In the space separating the motor 50 and the sidewall 33.4, there is a gear drive 32, 33, which is driven by the motor shaft shown in FIG. 9. An input gear 32 is mounted on the motor shaft and meshes with an output gear. A double-arm lever 54 to 56 is connected on the output side of the output gear 53. The details of this double-arm lever are shown in FIGS. 9, 7, and 6. A first arm 54 of this double-arm lever has a longitudinal guide 57 for a guide element 58, which is mounted like a crank on the output gear 53. This first arm 54 is nonrotatably connected with a second arm 56 of this double-arm lever by means of a bearing shaft 55, which is supported in bearing holes of the sidewalls 33.4, 33.2 of the module housing. The second arm 56 is mounted in the interior 35 of the housing, and its free end articulates with the inner end of the camera mount 32 by means of a joint pin 59. To this end, as FIG. 9 shows, a bushing is formed at the free end of the arm 56. This bushing receives the pin 59 and is mounted between a forked inner end of the camera mount 32 by means of the joint pin 59.

The forked inner end of the camera mount 32 is provided with two pivot pins 20, one of which can be seen in FIG. 9. The two pivot pins 35 determine the aforementioned axis of rotation of the camera mount 32. In the present embodiment, the axis of rotation is combined with a two-part connecting link guide 40.1, 40.2, which are located in the two opposite sidewalls 33.2 and 33.4 of the module housing 33 and are shown best in FIGS. 7 and 8. Each of the two connecting link guides 40.1, 40.2 has a slotted link 41.1, 41.2, which is sunk as a slot in the corresponding sidewall 33.2, 33.4 and in which corresponding sliding blocks 42.1, 42.2 slide. On the one hand, the two sliding blocks 42.1, 42.2 have a sleeve-like design and receive the aforementioned pivot pins of the camera mount 32 that serve as the axis of rotation 34. On the other hand, the two sliding blocks 42.1, 42.2 have a roller-like circumference, which facilitates their movement in the corresponding slotted links 41.1, 41.2. As is seen especially well in FIG. 6a, the slotted links 41.1, 41.2 consist of circular ring groove segments, which are arranged coaxially to the bearing shaft 55 of the double-arm lever. This gear unit produces, by means of the motor 50, the rotational-translational movement of the camera 31, which has already been described in detail, as the camera 31 moves between its retracted position 31.1 of FIGS. 4, 5a and its extended position 31.2 of FIGS. 6a, 6b.

So that the camera 31 can be extended, it is advisable to provide for an opening movement 45 of the handle 20 by motor. The closing movement of the handle 20 in the opposite direction can then be brought about by the aforementioned spring tension. Naturally, the same motor 50 that is used for the aforementioned rotational-translational movement of the camera mount 32 should also be used for this rotational movement about the hinge. In this connection, the motor 50 is provided with two gear outputs (not shown) or suitable double couplings, one of which is used for the control movement of the camera mount 32, while the other is used for the rotational movement about the hinge. These movements can be started at the beginning of the camera activation and ended after deactivation of the camera 31. To initiate these movements, the cover could be provided with control devices, which produce the opening movement of the handle 20 in the support shell 10 during the swiveling movement of the cover 38 shown in FIG. 6b. The movement in the opposite direction to close the handle could be managed by suitable means. The simplest solution is for these control devices to comprise a shoulder 65 on the cover 38 and a cooperating shoulder 66 on the handle 20, as shown in FIG. 6a.

Figure 11:
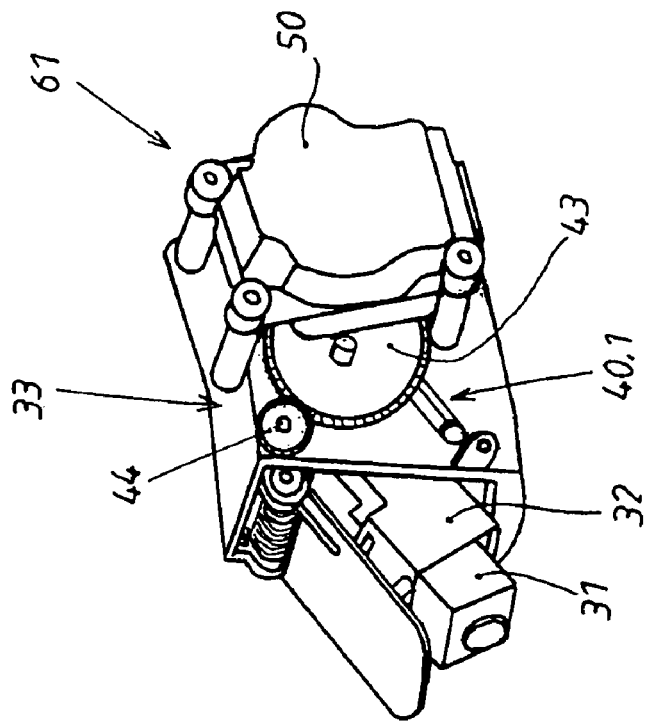
FIG. 11 shows, in a view that corresponds to FIG. 10, an embodiment of the module that is an alternative to the first embodiment illustrated in the preceding FIGS. 3 to 9.
Figure 10:
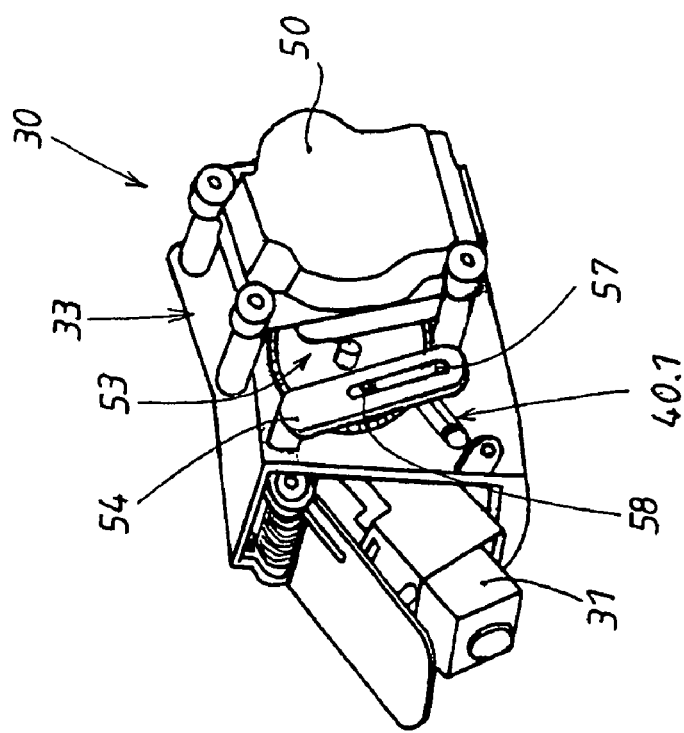
FIG. 10 shows the module in a perspective side view analogous to FIG. 7, when the camera is in its extended position and the associated gear unit is in the corresponding position.

FIG. 11 shows a second embodiment of the invention in the form of an alternative module 61 in a view analogous to the view in FIG. 10 of the first embodiment of the module 30. Only the differences will be described. In all other respects, the description of the first embodiment of the module 30 also applies here.

Instead of the second arm 56 provided in module 30, a gear 43 that meshes with an output gear 44 is installed in module 61. This output gear 44 in turn is nonrotatably connected with a bearing shaft 55 of the aforementioned lever arm 56. As in the first embodiment 30, this lever arm 56 articulates with the camera mount 32. Thus, in this second embodiment 61, the first arm 54 is merely replaced by the new output gear 44.

FIG. 12 shows a third embodiment 62 of the module, which has a differently designed gear unit for the rotational-translational movement of a camera 31' and its camera mount 32'. In this case as well, a motor 50' is connected with some separation to a sidewall 33.1 of a module housing 33', which has a U-shaped housing profile. An input gear 52', which meshes with a toothed quadrant 53', is mounted on the shaft of the motor 50'. The toothed quadrant 53' is nonrotatably connected with an arm 47 in the interior 35' of the housing by means of its rotatably supported shaft 55'. The end of the arm 47 fits into the inner space of a fork end 49, which is part of the camera mount 32'. The rotational-translational movement of the camera 31' is controlled by a double link drive 60.1, 60.2, whose motional impulse originates from the lever arm 47.

In this case as well, the two link drives 60.1, 60.2 have a two-part design and are located in the two sidewalls 33.1' and 33.2'. Naturally, the two opposing parts of the two link drives 60.1, 60.2 are designed identically to each other. Therefore, it is sufficient to describe the parts of one drive or the other which are visible in FIG. 12, and, of course, this description applies to both alike. First of all, the two link drives 60.1, 60.2 have two slots 63.1, 63.2 in the two sidewalls 33.1, 33.2. The two slots 63.1, 63.2 have different shapes, are offset in height, and serve as slotted links for roller-like sliding blocks 64.1, 64.2. These roller-like sliding blocks 64.1, 64.2 are seated on the outside of the two fork legs of the fork end 49 of the camera mount 32' and form two independent swivel points for the common swiveling movement of the camera 31'. The camera 31' is rotationally-translationally moved between its retracted position shown in FIG. 12 and an extended position (not shown) outside of the module housing 33'. The latter is of independent inventive significance.

Figure 3:
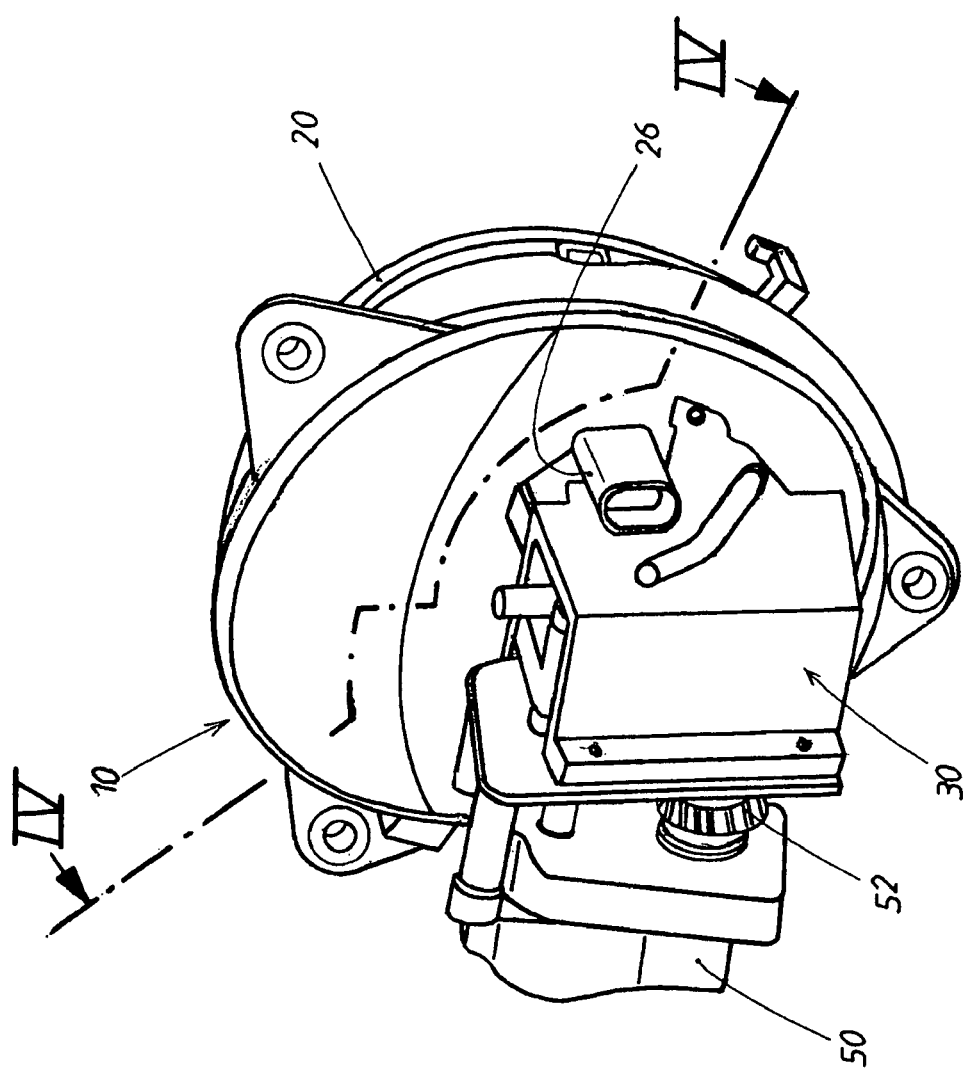
FIG. 3 shows a rear perspective view of the complete device consisting of the support shell and the module.

LIST OF REFERENCE NUMBERS 10 shell-like support, support shell
11 axis of 20
12 shell opening of 10
13 interior of 10 (FIG. 6a)
14 actuator of 18 (FIG. 4)
15 trunk lid (FIG. 1)
16 opening in 17 (FIG. 1)
17 exterior cladding of 15 (FIG. 1)
18 electric switch (FIG. 4)
10 contact pins of 18 (FIG. 4)
20 handle
20.1 closed position of 20, unactuated (FIG. 5b)
20.2 open position of 20, actuated (FIGS. 4, 6b)
21 hinge rotation arrow of 20 (FIGS. 4, 6b)
22 push operation of 20 (FIG. 5b)
23 rear wall of 10 (FIG. 2)
24 shoulder on 20 for 14
25 hole in 23 (FIGS. 2, 5b)
26 plug connector for 18 (FIGS. 2, 3)
27 spring for 38 (FIG. 7)
28 gasket for 38 (FIG. 7)
29 field of view of 31 in 31.2 (FIG. 6b)
30 module, first embodiment (FIGS. 7 to 10)
31 camera of 30 (FIG. 5a)
31' camera of 62 (FIG. 12)
31.1 retraction movement of 31 (FIG. 5a)
31.2 extension movement of 31 (FIGS. 6a, 6b)
32 mount for 31, camera mount (FIG. 5a)
32' camera mount of 62 (FIG. 12
32.1 inoperative position of 32 (FIG. 6a)

32.2 operative position of 32 (FIG. 6a
32.3 path of the swiveling movement of 32 (FIG. 6a)
32.4 arrow of the back rotation of 32 (FIG. 6a)
32.5 translational component of the path of 32 (FIG. 6a)
33 module housing of 30 (FIGS. 4 to 9)
33' module housing of 62 (FIG. 12)
33.1 front sleeve wall of 33 (FIGS. 8, 9)
33.1' first sidewall of 33' (FIG. 12)
33.2 first sidewall of 33 (FIGS. 8, 9)
33.2' second sidewall of 33' (FIG. 12)
33.3 rear wall of 33 (FIGS. 8, 9)
33.4 second sidewall of 33 (FIGS. 6a, 9)
34 pivot pin on 32, axis of rotation (FIGS. 6a, 9)
35 interior of housing 33 (FIGS. 5a, 9)
35' interior of housing 33' (FIG. 12)
36 image-recording end of 31, objective (FIGS. 5a, 6a)
37 window in 33.2 (FIG. 5a)
38 cover for 37 (FIGS. 7, 9)
38.1 closed position of 38 (FIG. 6b)
38.2 open position of 38 (FIG. 6b)
39 swivel bearing of 38 (FIGS. 8, 9)
40.1 connecting link guide, first part at 33.4 (FIGS. 7, 9)
40.2 connecting link guide, second part at 33.2 (FIGS. 8, 9)
41.1 slotted link in 33.4 (FIG. 9)
41.2 slotted link in 33.2 (FIGS. 8, 9)
42.1 sliding block in 41.1, swivel bearing mount for 34 (FIGS. 6a, 9)
42.2 sliding block in 41.2, swivel bearing mount for 34 (FIGS. 6a, 9)
43 middle gear in 61 (FIG. 11)
44 output gear in 61 (FIG. 11)
45 mounting bracket (FIGS. 7, 8)
46 actuator on 32 for 38 (FIG. 6a)
47 lever arm on 55' (FIG. 12)
48 path of swiveling movement of 38 (FIG. 6b)
49 fork end of 32' (FIG. 12)
50 motor of 30 (FIG. 7)
50' motor of 62 (FIG. 12)
51 spacer for 50 (FIG. 7)
52 input gear of the gear drive of 30 (FIGS. 7, 9)
52' input gear of the gear drive of 62 (FIG. 12)
53 output gear of the gear drive in 30 (FIGS. 7, 9)
53' toothed quadrant of the gear drive in 62 (FIG. 12)
54 first arm of a double-arm lever (FIGS. 9, 7)
55 bearing shaft of the double-arm lever (FIGS. 6, 7, 9)
55' bearing shaft for 53', 47 (FIG. 12)
56 second arm of the double-arm lever (FIGS. 6, 9)
57 longitudinal guide for 58 in 54, guide (FIGS. 9, 10)
58 guide element on 53 for 57 (FIG. 9)
59 joint pin for 56 on 32 (FIGS. 6a, 9)
60.1 first link drive of 62 (FIG. 12)
60.2 second link drive of 62 (FIG. 12)
61 second embodiment of the module (FIG. 11)
62 third embodiment of the module (FIG. 12)
63.1 first slotted link of 60.1 (FIG. 12)
63.2 second slotted link of 60.2 (FIG. 12)
64.1 roller-like sliding block for 60.1 (FIG. 12)
64.2 roller-like sliding block for 60.2 (FIG. 12)
65 shoulder on 38 (FIG. 6a)
66 cooperating shoulder on 20 (FIG. 6a)

What is claimed is:

1. A device for opening a lock, which acts between a moving vehicle body part and a stationary part of the body, said device simultaneously obtaining images of an area outside the vehicle, the device comprising: a camera, with a support shell, which camera is located in an opening of exterior cladding of the body of the vehicle; a handle rotatably supported in the support shell on a hinge, wherein the handle is moveable between a closed position, in which the handle closes a shell opening of the support shell and leaves the lock unactuated, and an open position, in which the handle is manually swung on the hinge out of the support shell and/or into the support shell to actuate the lock, the camera being mounted on a rear wall of the support shell,
wherein the rear wall of the support shell has a hole; a module housing mounted behind the hole in the rear wall; a mount for the camera rotatably supported and translationally guided in the module housing in order to swivel the camera between a retracted position and an extended position; and a drive unit and a gear unit mounted on the module housing to provide rotational-translational movement of the camera mount.

2. A device in accordance with claim 1, wherein the module housing has a window, in the retracted position, the camera facing away from the window in the module housing and occupying a space-saving longitudinal position in an interior of the module housing.

3. A device in accordance with claim 1, wherein the camera has an image-recording end, in the extended position, the camera occupying an inclined position in a housing interior, and the image-recording end extending from the module housing.

4. A device in accordance with claim 3, wherein, in the extended position, the camera also extends from the shell opening of the support shell, and the drive unit is an electric motor.

5. A device in accordance with claim 2, wherein, in the extended position of the camera mount, the camera in the module housing arranged substantially parallel to the open position of the handle in the support shell.

6. A device in accordance with claim 1, further comprising a single type of uniform module that is assignable to several different types of the device, the uniform module being mountable on and detachable from the device.

7. A device in accordance with claim 5, and further comprising a cover configured to cover the window of the module housing.

8. A device in accordance with claim 7, wherein the cover is rotationally supported on the module housing and is acted upon by spring tension, which acts to press the cover against the window of the module housing.

9. A device in accordance with claim 7, further comprising a gasket arranged between the window of the module housing and the cover to seal the interior of the module housing from an interior of the support shell in a closed position of the cover.

10. A device in accordance with claim 8, further comprising an actuator on the camera mount or on the gear unit, the actuator being operative to produce the movement of the camera mount and effect movement of the cover with respect to the window of the module housing.

11. A device in accordance with claim 10, wherein the actuator consists of a projection arranged on the camera mount to swivel the cover open against the spring tension during the swiveling movement of the camera mount out of the retracted position and into the extended position of the camera.

12. A device in accordance with claim 1, further comprising a motor mounted on an exterior of the module housing.

13. A device in accordance with claim 12, further comprising spacers arranged between the motor and the module housing, at least part of the gear unit that serves to move the camera mount being arranged between the spacers.

14. A device in accordance with claim 1, further comprising at least one connecting link drive arranged to produce the rotational-translational movement of the camera mount.

15. A device in accordance with claim 14, wherein the camera mount has a swivel bearing integrated in a sliding block of the link drive.

16. A device in accordance with claim 14, wherein the link drive consists of a two-part sliding block on the camera mount and a two-part slotted link on the module housing.

17. A device in accordance with claim 16, wherein the module housing consists of a sleeve with a rectangular profile, where the window of the module housing is set in a front wall of the sleeve, and where corresponding parts of the slotted link are located on sidewalls of the sleeve that are arranged on both sides of the front wall of the sleeve.

18. A device in accordance with claim 16, wherein the sliding block consists of a section of a pivot element of the camera mount, about which the camera can be swiveled between the retracted position and the extended position.

19. A device in accordance with claim 1, further comprising a gear drive arranged to move the camera mount, where a double-arm lever is connected on an output side of the gear drive, where the two arms of the double-arm lever are nonrotatably connected with each other and are rotatably supported in the module housing with a common bearing shaft, where one of the arms acts on an output gear of the gear drive via a guide and a guide element, and where the other arm of the double-arm lever articulates with the camera mount.

20. A device in accordance with claim 1, further comprising a gear drive arranged to move the camera mount, where an output gear of the gear drive is nonrotatably connected with a bearing shaft of a lever arm, and where the lever arm articulates with the camera mount.

21. A device in accordance with claim 1, further comprising a gear drive arranged to move the camera mount, where a shaft of an output gear of the gear drive is nonrotatably connected with a lever, which is rotatably supported in the module housing, where an end of the lever articulates with the camera mount, and further comprising at least one link drive that acts on the camera mount.

22. A device in accordance with claim 1, further comprising a double link drive that controls the rotational-translational movement of the camera mount, the double link drive including two slotted links offset from each other on the module housing, the slotted links being engaged by two sliding blocks located on the camera mount.

23. A device in accordance with claim 7, wherein the cover is provided with control devices that produce an opening movement and/or a closing movement of the handle in the support shell during the swiveling movement of the cover.

24. A device in accordance with claim 23, wherein the control devices of the cover include a shoulder on the cover and a cooperating shoulder on the handle, the handle being under spring tension in a direction of its closed position.

25. A device in accordance with claim 23, further comprising a motor arranged to effect the opening movement and/or the closing movement of the handle, where the motor starts the movement of the handle in an opening direction no later than a beginning of camera activation and/or ends movement of the handle in a closing direction after deactivation of the camera.

26. A device in accordance with claim 25, wherein a single motor is provided for swiveling the camera mount and for hinged rotation of the handle.

27. A device in accordance with claim 26, wherein the motor has two gear outputs and/or couplings, one of which is used for the control movement of the camera mount, while the other is used for the rotational movement of the handle.

28. A device in accordance with claim 1, wherein, when the handle is operated, the handle acts on the lock by mechanical elements.

29. A device in accordance with claim 1, wherein, when the handle is operated, the handle acts on the lock by electric or electronic elements.

* * * * *